(12) United States Patent
Kulkarni et al.

(10) Patent No.: US 8,880,882 B2
(45) Date of Patent: Nov. 4, 2014

(54) SECURELY PERFORMING PROGRAMMATIC CLOUD-BASED DATA ANALYSIS

(75) Inventors: Rahul S. Kulkarni, Maharashtra (IN); Satyan Coorg, Bangalore (IN); Pankaj Risbood, Bangalore (IN)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 13/439,019

(22) Filed: Apr. 4, 2012

(65) Prior Publication Data
US 2013/0268757 A1 Oct. 10, 2013

(51) Int. Cl.
*H04L 9/32* (2006.01)

(52) U.S. Cl.
USPC ........... 713/168; 713/150; 380/149; 380/150; 380/229; 705/67

(58) Field of Classification Search
CPC . H04L 2209/56; H04L 2209/20; H04L 63/08; H04L 63/0428; H04L 63/062; H04L 63/12; H04L 9/0637; H04L 9/0643; H04L 9/3234; H04L 9/3236; H04L 9/3247; G06F 11/1456; G06F 11/1458; G06F 12/0862; G06F 12/1408; G06F 21/72; G06F 21/79; G06F 21/80; G06F 21/805; H04N 21/2347; H04N 21/2381; H04N 21/2541; H04N 21/25816; H04N 21/4405; H04N 21/6125; H04N 21/63345; H04N 21/63775; H04N 21/6437; H04N 21/835; H04N 21/8355; H04N 7/1675; H04N 7/173; H04N 7/17318; H04W 12/01
See application file for complete search history.

(56) References Cited

U.S. PATENT DOCUMENTS

| 7,529,834 | B1 * | 5/2009 | Birrell et al. | 709/226 |
|---|---|---|---|---|
| 2002/0015491 | A1 * | 2/2002 | Nishioka et al. | 380/30 |
| 2002/0095568 | A1 * | 7/2002 | Norris et al. | 713/151 |
| 2003/0128843 | A1 * | 7/2003 | Brown et al. | 380/46 |
| 2005/0120232 | A1 * | 6/2005 | Hori et al. | 713/193 |
| 2005/0216731 | A1 * | 9/2005 | Saito et al. | 713/153 |
| 2007/0083757 | A1 * | 4/2007 | Nakano et al. | 713/168 |
| 2010/0100721 | A1 * | 4/2010 | Su et al. | 713/150 |
| 2010/0257351 | A1 * | 10/2010 | O'Connor et al. | 713/150 |
| 2012/0011364 | A1 * | 1/2012 | Rubin | 713/168 |
| 2012/0137117 | A1 * | 5/2012 | Bosch et al. | 713/2 |
| 2012/0297189 | A1 * | 11/2012 | Hayton et al. | 713/165 |
| 2012/0324242 | A1 * | 12/2012 | Kirsch | 713/189 |

OTHER PUBLICATIONS

Notification of Transmittal of the International Search Report and the Written Opinion of the International Searching Authority, or the Declaration issued in PCT/US2013/035290 on Jul. 11, 2013, 11 pages.

(Continued)

*Primary Examiner* — Philip Chea
*Assistant Examiner* — Khoi Le
(74) *Attorney, Agent, or Firm* — Fish & Richardson P.C.

(57) ABSTRACT

A request from a client system to perform computations on encrypted data is received at a server system. A request for a data key configured to decrypt the encrypted data is sent from the server system to the client system. The data key from the client system is received at the server system. The encrypted data is accessed at the server system. The encrypted data is decrypted using the data key to generate unencrypted data at the server system. The computations are performed on the unencrypted data to generate result data at the server system. The result data is provided to the client system.

19 Claims, 6 Drawing Sheets

(56) References Cited

OTHER PUBLICATIONS

Peterson, Erik, "Encrypting Your Data on Amazon EC2," Nov. 26, 2011, 9 pages, retrieved from the internet on Jun. 14, 2013, http://silvexis.com/2011/11/26/encrypti ng-your-data-on-amazon-ec2/.

Jonas, John, "Amazon Web Services EC2," Feb. 3, 2010, 44 pages, retrieved from the internet on Jun. 17, 2013, http://media.jonasblog.com/docs/Amazon_AWS_Final_3.pdf.

Hardiman, Nick, "Backing Up and Restoring Snapshots on Amazon EC2 Machines," Mar. 21, 2013, 3 pages, retrieved from the internet on Jun. 17, 2013, http://www.techrepublic.com/blog/datacenter/backing-up-and-restoring-snapshots-on-amazon-ec2-machines/5434.

Amazon: "AWS Security Best Practices," Jan. 21, 2010, 5 pages, retrieved from the internet on Jun. 17, 2013, http://d36cz9buwrultt.cloudfront.net/Whitepaper_Security_Best Practices_2010.pdf.

Schneier, B. Editor, "Communications Using Public-Key Cryptography," Jan. 1, 1996, Applied Cryptography, Protocols, Algorithms, and Source Code in C, John Wiley & Sons, Inc, New York, pp. 31-34, 52-54, and 185-187, XP000864215, ISBN: 978-0-471-11709-4.

\* cited by examiner

SECURELY PERFORMING PROGRAMMATIC CLOUD-BASED DATA ANALYSIS

BACKGROUND

This disclosure relates to providing a secure computing environment.

A computing environment may provide a remote user with the ability to access dynamic and extensive computing resources without requiring significant user computing resources. One concern for performing user-provided computation in the computing environment is the security of user data.

SUMMARY

In one aspect, a request from a client system to perform computations on encrypted data is received at a server system. A request for a data key configured to decrypt the encrypted data is sent from the server system to the client system. The data key from the client system is received at the server system. The encrypted data is accessed at the server system. The encrypted data is decrypted using the data key to generate unencrypted data at the server system. The computations are performed on the unencrypted data to generate result data at the server system. The result data is provided to the client system.

Implementations may include one or more of the following features. Performing the computations may include performing, at the server system, the computations on the unencrypted data in a virtual machine. Receiving the request to perform computations may include receiving, at the server system and from the client system, computer code to perform the computations. Performing the computations on the unencrypted data in the virtual machine may include performing the computations on the unencrypted data in the virtual machine using the computer code received from the client system.

A request is received at the server system and from the client system to instantiate the virtual machine, the request to instantiate the virtual machine may include a public key of a public/private key pair associated with the client system. A secure channel is established between the client system and the server system using the received public key, and where receiving the request to perform computations on encrypted data may include receiving, at the server system, the request to perform computations on the encrypted data through the secure channel between the client system and the server system.

Establishing the secure channel may include encrypting a first plaintext using the received public key to generate a ciphertext. The ciphertext is sent to the client system such that the client system is able to decrypt the ciphertext using the private key of the public/private key pair to generate a second plaintext. In response to sending the ciphertext to the client system, the second plaintext is received from the client system. Whether the second plaintext is the same as the first plaintext is determined, and if the second plaintext is the same as the first plaintext, the secure channel is established between the client system and the server system.

The encrypted data is received, at the server system and from the client system, the encrypted data, and the received encrypted data is stored at the server system. Providing the result data to the client system may include sending the result data to the client system through a secure channel. Providing the result data to the client system may include encrypting the result data using the data key to generate encrypted result data. The encrypted result data is stored at a hosted storage system. The client system is provided with an indication of where the encrypted result data is stored such that the client system is able to retrieve the encrypted result data from the hosted storage system.

Receiving a request to perform computations on encrypted data may include receiving, at the server system and from the client system, a one-time job key associated with the computations. Sending a request for the data key may include sending the one-time job key from the server system to the client system such that the client system is able to verify that the data key has not previously been sent to the server system for use in performing the computations.

In another aspect, a request is sent, to a server system and from a client system, to perform computations on encrypted data. A request for a data key configured to decrypt the encrypted data is received, from the server system and at the client system. In response to receiving the request for the data key, whether the data key should be sent to the server system is determined at the client system. If the determination indicates the data key should be sent to the server system, the data key is sent to the server system such that the server system accesses the encrypted data, decrypts the encrypted data using the data key to generate unencrypted data, and performs the computations on the unencrypted data to generate result data. The result data is accessed at the client system.

Implementations may include one or more of the following features. Sending the request to perform computations may include sending, to the server system and from the client system, computer code to perform the computations. A request to instantiate a virtual machine is sent, to the server system and from the client system, where sending the request to perform computations on encrypted data may include sending a request to perform the computations on the encrypted data in the virtual machine.

A secure channel may be established between the client system and the server system using the received public key, where sending the request to perform computations on encrypted data may include sending, to the server system, the request to perform computations on the encrypted data through the secure channel between the client system and the server system. A ciphertext is received at the client system, where the ciphertext was generated at the server system by encrypting a first plaintext using the received public key. The ciphertext is decrypted using the private key of the public/private key pair to generate a second plaintext. The second plaintext is sent to the server system such that the server system determines whether the second plaintext is the same as the first plaintext, and, if the second plaintext is the same as the first plaintext, establishes the secure channel between the client system and the server system.

A first plaintext may be received at the client system from the server system. The first plaintext is encrypted using the private key of the public/private key pair to generate a ciphertext. The ciphertext is sent from the client system to the server system such that the server system decrypts the received ciphertext using the public key to generate a second plaintext, determines whether the second plaintext is the same as the first plaintext, and, if the second plaintext is the same as the first plaintext, establishes the secure channel between the client system and the server system.

Data to generate the encrypted data may be encrypted at the client system. The encrypted data is stored at a hosted storage system, where the request to perform computations on the encrypted data includes a location of the encrypted data at the hosted storage system. Accessing the result data may include receiving the result data at the client system through a secure channel. The server system encrypts the result data to generate encrypted result data and stores the encrypted result data at a hosted storage system, and accessing the result data at the client system may include retrieving the encrypted result data from the hosted storage system.

Sending a request to perform computations on encrypted data may include sending, to the server system and from the client system, a one-time job key associated with the computations. Receiving a request for the data key may include receiving the one-time job key from the server system to the client system. Determining whether the data key should be sent to the server system may include verifying that the data key has not previously been sent to the server system for use in performing the computations.

In another aspect, a server system is configured to receive, from a client system, a request to perform computations on encrypted data. A request for a data key configured to decrypt the encrypted data is sent to the client system. The data key is received, from the client system. The encrypted data is accessed. The encrypted data is decrypted using the data key to generate unencrypted data. The computations are performed on the unencrypted data to generate result data.

The client system is configured to send, to the server system, the request to perform computations on encrypted data. The request for a data key configured to decrypt the encrypted data is received from the server system. In response to receiving the request for the data key, whether the data key should be sent to the server system is determined. In response to determining that the data key should be sent to the server system, the data key is sent to the server system. The result data generated by the server system is accessed.

Implementations may include one or more of the following features. To perform the computations, the server system may be configured to perform the computations on the unencrypted data in a virtual machine. To receive the request to perform computations, the server system may be configured to receive from the client system, computer code to perform the computation. To perform the computations on the unencrypted data in the virtual machine, the server system may be configured to perform the computations on the unencrypted data in the virtual machine using the computer code received from the client system.

The server system may be configured to receive from the client system, a request to instantiate the virtual machine, the request to instantiate the virtual machine including a public key of a public/private key pair associated with the client system. A secure channel between the client system and the server system is established using the received public key, and where to receive the request to perform computations on encrypted data, the server system is configured to receive the request to perform computations on the encrypted data through the secure channel between the client system and the server system.

To establish the secure channel, the server system may be configured to encrypt a first plaintext using the received public key to generate a ciphertext. The ciphertext is sent to the client system such that the client system is able to decrypt the ciphertext using the private key of the public/private key pair to generate a second plaintext. In response to sending the ciphertext to the client system, the second plaintext is received from the client system. Whether the second plaintext is the same as the first plaintext is determined, and if the second plaintext is the same as the first plaintext, the secure channel between the client system and the server system is established.

To establish the secure channel, the server system may be configured to generate a first plaintext. The first plaintext is sent to the client system such that the client system is able to encrypt the first plaintext using the private key of the public/private key pair to generate a ciphertext. In response to sending the plaintext to the client system, the ciphertext is received from the client system. The received ciphertext is decrypted using the public key to generate a second plaintext. Whether the second plaintext is the same as the first plaintext is determined, and if the second plaintext is the same as the first plaintext, the secure channel between the client system and the server system is established.

The server system may be configured to receive from the client system, the encrypted data, and store the received encrypted data. To provide the result data to the client system, the server system may be configured to send the result data to the client system through a secure channel. To provide the result data to the client system, the server system may be configured to encrypt the result data using the data key to generate encrypted result data. The encrypted result data is stored at a hosted storage system. The client system is provided with an indication of where the encrypted result data is stored such that the client system is able to retrieve the encrypted result data from the hosted storage system.

To receive a request to perform computations on encrypted data, the server system may be configured to receive from the client system, a one-time job key associated with the computations. To send a request for the data key, the server system may be configured to send the one-time job key to the client system such that the client system is able to verify that the data key has not previously been sent to the server system for use in performing the computations.

The client system may be configured to encrypt data to generate the encrypted data. The encrypted data is stored at a hosted storage system, and where the request to perform computations on the encrypted data includes a location of the encrypted data at the hosted storage system.

To send a request to perform computations on encrypted data, the client system may be configured to send to the server system a one-time job key associated with the computations. To receive a request for the data key, the client system may be configured to receive the one-time job key from the server system. To determine whether the data key should be sent to the server system, the client system may be configured to verify that the data key has not previously been sent to the server system for use in performing the computations.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, a client system is coupled to a computing cluster environment in which user-provided computations can be performed. For example, in one implementation, the client system encrypts data with a data key and to stores the encrypted data in a place accessible to the computing cluster environment. The client system then establishes a secure connection with the computing cluster environment, provides computations (for example, a user-provided program or executable) to the computing cluster environment, and requests that a virtual machine (VM) system perform the provided computations on the encrypted data. The computing cluster environment configures the VM system to access the encrypted data, and the VM system decrypts the encrypted data by requesting the data key from the client. The VM system then performs the user-provided computation and makes result data accessible to the client system.

Implementations may include one or more of the following advantages. Data may be stored and uploaded in an encrypted form, and even the computing cluster environment provider does not have access to the data when the data is stored in the computer cluster environment. Decryption of data, required for user-provided computation, may be performed on an as needed basis and for short durations under the control of the client system. These features may increase the security of the data.

Figure 1:
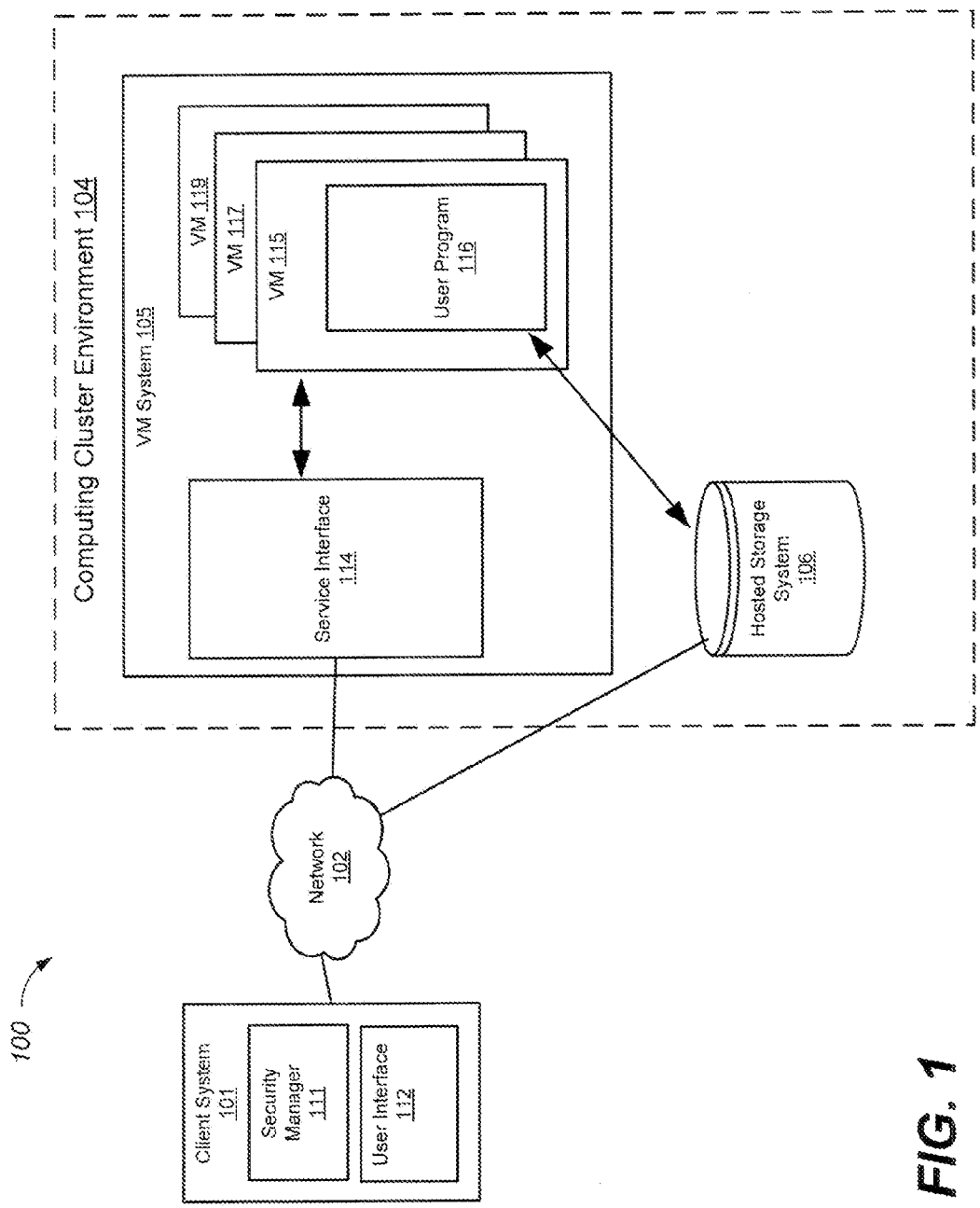
FIG. 1 is a schematic diagram illustrating an example of a system that can securely compute a user-provided computation job in a computing cluster environment.

FIG. 1 is a schematic diagram illustrating an example of a system 100 that can securely compute a user-provided computation job in a computing cluster environment 104. The system 100 includes a client system 101 coupled to the computing cluster environment 104 over a network 102. The client system 101 may be a laptop computer, a tablet computer, or another portable or mobile device operated by a user. In another implementation, the client system 101 is not portable or mobile, but rather is a desktop computer or a server. In more detail, the client system 101 includes a security manager 111 and a user interface 112. The security manager 111 may store or have access to security keys including a data key (DEK) for encrypting and decrypting data, a public and private key pair for establishing a secure connection with the computing cluster environment, and a one-time session key (OTK) for verifying the authenticity of a particular computation session. In some implementations, the security manager 111 may manage, distribute, and verify the security keys during a computation session with the computing cluster environment 104.

A developer may develop a user program that is designed to perform computations on certain data. The client system 101 may send the user program to the computing cluster environment 104 where the user program is executed to perform computations on the data. To keep the data secure until the time of the computation in the computing cluster environment 104, the client system 101 may encrypt the data using the DEK. In one implementation, the client system 101 stores the encrypted data at a hosted storage system 106. In another implementation, the client system 101 may send and store the encrypted data directly on a VM system 105 implemented at the computing cluster environment 104.

The user interface 112 provides the user an input and output interface for sending requests to and receiving responses from the computing cluster environment 104. In one implementation, the user interface 112 can connect to an external system, such as the computing cluster environment 104, with an insecure connection. In another implementation, the user interface 112 can connect to an external system with a secure connection, established by the public and private key pair managed by the security manager 111.

The network 102 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. Networks may include multiple networks or subnetworks, each of which may include, for example, a wired or wireless data pathway.

Figure 4:
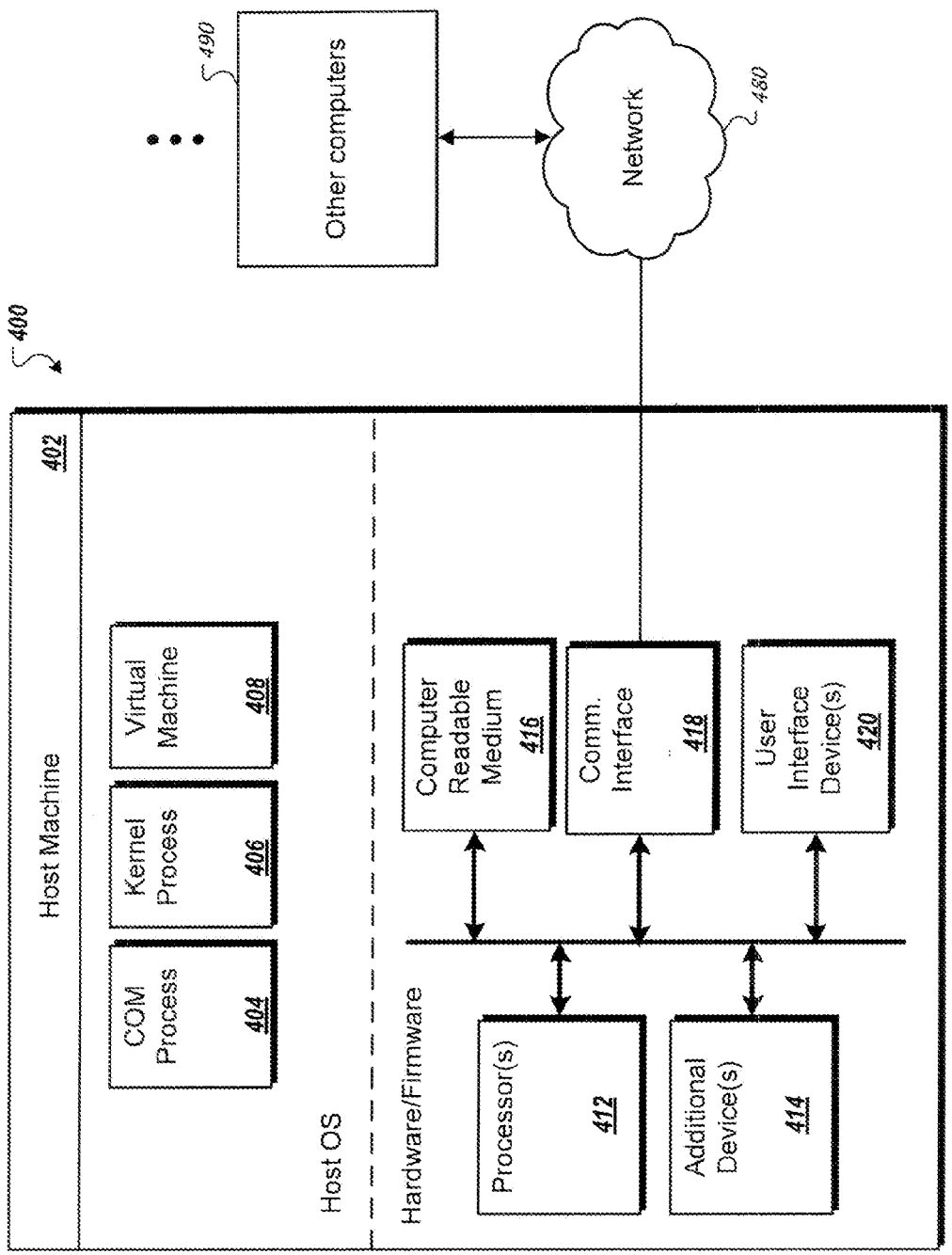
FIG. 4 is a schematic diagram showing an example of a host machine.

The computing cluster environment 104 may be implemented using a server system that includes one or more host machines such as those described with respect to FIG. 4. The computing cluster environment 104 includes a VM system 105 and an externally accessible hosted storage system 106. In more detail, the VM system 105 includes a service interface 114 and one or more instances of virtual machines (VMs) 115, 117, and 119. The service interface 114 facilitates communications between the client system 101 and the VM system 105. The service interface 114 may establish a secure connection with the client system 101 over a network 102 upon receiving requests from the client system 101. The service interface 114 may request and receive security keys from the client system 101, and may forward the security keys to a VM in the VM system 105. The service interface 114 may instantiate or request to instantiate one or more instances of VMs in the VM system 105, for example, in response to a request from the client system 101. The service interface 114 may send messages to or receive messages from a VM in the VM system 105.

The service interface 114 may implement a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. In a REST-based interface, a data object is accessed as a resource, uniquely named using a URI, and the client system and service exchange representations of resource state using a defined set of operations. For example, requested actions can be represented as verbs, such as by HTTP GET, PUT, POST, HEAD, and DELETE verbs.

In general, one or more of instances of VMs 115, 117, and 119 can be instantiated in a VM system 105. Each VM 115, 117, and 119 is allocated a set of computation resources including virtual memory pages in the VM system 105, and can read, write, and execute a computing job using the computation resources. The client system 101 can provide a user program 116 that implements the computing job to a VM 115, 117, or 119 through the service interface 114. Depending on the computation resources required to perform the computing job, the VM system 105 may determine the allocation of computation resources to the computing job, including the number of VM instances and the virtual memory pages. A VM 115, 117, and 119 can communicate with other components in the computing cluster environment 104, including the service interface 114 and the hosted storage system 106.

In the example system 100, three instances of VMs 115, 117, and 119 have been instantiated in the VM system 105. The user program 116 runs on the VM 115, and the VM 115 communicates with the service interface 114 and the hosted storage system 106 to retrieve security keys and encrypted data necessary to execute the user program 116 to perform the computations on the data. In general, the connections between the service interface 114 and the VMs 115, 117, and 119 are secure in the VM system 105.

The hosted storage system 106 is a data storage system in the computing cluster environment 104, which can be a computer readable medium or one or more additional devices, for example, one or more of a floppy disk device, a hard disk device, an optical disk device, or a tape device. In some implementations, the hosted storage system 106 is external to the VM system 105. In one implementation, the hosted storage system 106 may communicate with another system, device, or interface (such as the client system 101) through an insecure connection. For example, the connection between the client system 101 and the hosted storage system 106 may be over a public network without security oversight. In another implementation, the hosted storage system 106 may communicate with another system, device, or interface through a secure connection.

Figure 2A:
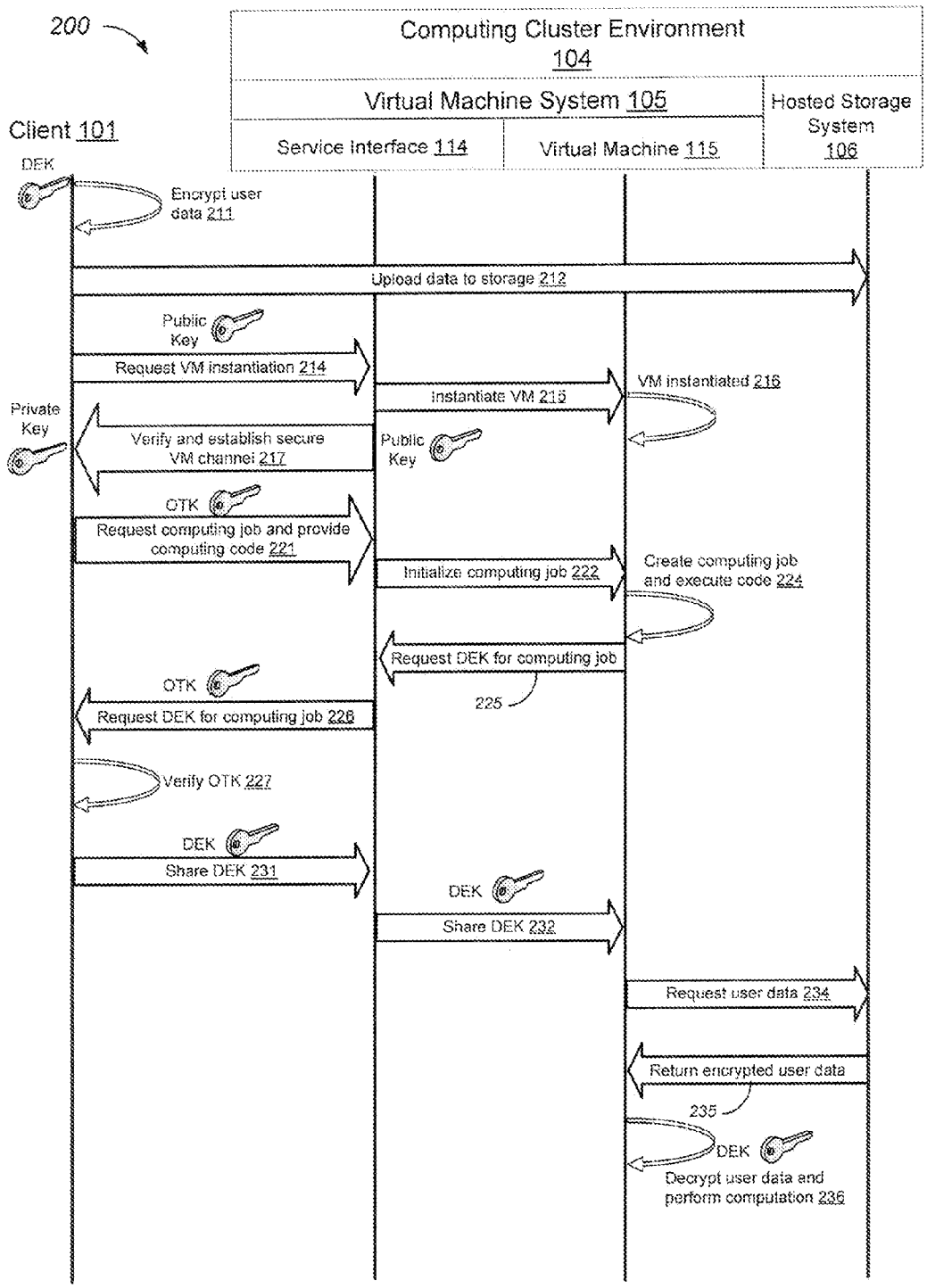
FIG. 2A is a diagram illustrating an example of a process in which the computing cluster environment securely computes a computation job provided by the client.

FIG. 2A is a diagram illustrating an example of a process 200 in which the computing cluster environment 104 securely computes a computation job provided by the client 101. While the process is described in the context of the system 100, other systems may be used to implement the process.

In this example, the client 101 stores encrypted data to be processed at a hosted storage system 106, prior to initiating a computing job in the computing cluster environment 104. The client 101 uses a data key (DEK) to encrypt the unencrypted data to generate encrypted data at the client system (211). In some implementations, if the size of the unencrypted data exceeds the limit of which a piece of data can be encrypted at once, the client 101 may divide the unencrypted data into several pieces and then encrypt each piece of unencrypted data using a different (or the same) DEK.

The client 101 then stores the encrypted data at the hosted storage system 106 (212). For example, the client 101 may send a request to store the data to the hosted storage system 106, with the request including the data. In some implementations, the connection between the client 101 and the hosted storage system 106 may not be secure. The security of the data can still be preserved over the insecure connection since the data has been encrypted with the DEK (211).

The client 101 then sends to the service interface 114 a request to establish a secure channel and to instantiate a VM in the computing cluster environment 104 (214). The client's request is received by the service interface 114 in the VM system 105. The request includes a public key of a public/private key pair associated with the client system 101. As described further below, the public key is used by the service interface 114 to establish the secure channel.

Upon receiving the request, the service interface 114 instantiates a VM 115 in the VM system 105 (215). The VM 115 is instantiated with allocated computing resources including virtual memory pages (216). In some implementations, the VM system 105 can add or remove the computing resources dynamically, depending on the required resources of a computing job.

Using the public key information from the client 101, the service interface 114 attempts to establish a secure channel between the client 101 and the VM system 105 (217). In one implementation, the service interface 114 encrypts a first plaintext using the received public key to generate a ciphertext. Then the service interface 114 sends the ciphertext to the client 101, where the client 101 is able to decrypt the ciphertext using the private key of the public/private key pair to generate a second plaintext. The client 101 then sends the second plaintext to the service interface 114, and the service interface 114 determines whether the second plaintext is the same as the first plaintext. If the second plaintext is the same as the first plaintext, the service interface 114 establishes the secure channel between the client 101 and the service interface 114.

In another implementation, the service interface 114 generates a first plaintext, and sends the first plaintext to the client 101. The client 101 then encrypts the first plaintext using the private key of the public/private key pair to generate a ciphertext, and sends the ciphertext from the client 101 to the service interface 114. Upon receiving the ciphertext, the service interface 114 decrypts the received ciphertext using the public key to generate a second plaintext, and determines whether the second plaintext is the same as the first plaintext. If the second plaintext is the same as the first plaintext, the service interface 114 establishes the secure channel between the client 101 and the service interface 114.

Once the secure channel between the client 101 and the service interface 114 is established, the client 101 sends a request to perform computation on the encrypted data in the VM 115 (221). The request includes the computer code, such as the user program 116, for performing the computations, and a one-time job key (OTK) for verifying the validity of the computing session. In some implementations, the request to perform computations on the encrypted data also includes a location of the encrypted data at the hosted storage system 106.

The service interface 114 receives the request to perform computations on the encrypted data, including the computer code and the OTK associated with the computing session. The service interface 114 then initializes a computing job in the VM 115, which includes sending the computer code to the VM 115 (222). In some implementations, the service interface 114 may adjust the allocation of computing resources for the VM 115, as required by the computer code.

Once the VM 115 receives the computer code for performing computations on the encrypted data, the VM 115 creates a computing job and executes the computer code (224). To decrypt the encrypted data, the VM 115 sends a request to the service interface 114 to acquire the DEK security key configured to decrypt the encrypted data (225). The service interface 114 then sends a request, including the OTK, to the client 101 for the DEK security key (226), so the client 101 is able to verify that the computing session is valid and the DEK has not previously been distributed to the service interface 114 for use in performing the computations.

The client 101 receives from the service interface 114 the request for the DEK configured to decrypt the encrypted data. In response to receiving the request for the DEK, the client 101 determines whether the DEK should be sent to the service interface 114 (227). In this example, the OTK sent from the service interface 114 is checked by the client 101 to validate the computing session, and to verify that the DEK has not previously been sent to the service interface 114 for use in performing the computations. Once the client 101 determines the DEK should be sent to the service interface 114, the client 101 sends the DEK to the service interface 114 through the secure channel (231).

The service interface 114 receives the DEK from the client 101, and then shares the DEK with the VM 115 through a secure connection in the VM system 105 (232). The VM 115 then makes a request to the hosted storage system 106 to access the encrypted data stored at the hosted storage system 106 (234). In some implementations, the location of the encrypted data can be sent by the client 101 in the request to for the computing job (221). In some implementations, the location of the encrypted data can be embedded in the computing code sent to the VM 115. In some implementations, the VM 115 may send the request to retrieve the encrypted data at the hosted storage system (234) through an insecure connection. In some implementations, the VM 115 may send the request (234) through a secure connection.

In response to the request, the hosted storage system 106 sends the encrypted user data to the VM 115 (235). Then the VM 115 decrypts the encrypted data using the DEK to generate unencrypted data. The executing computer code then performs the computations on the unencrypted data to generate result data (236). In some implementations, the computations (e.g. user program 116) may control the encrypted and decrypted data storage within the VM 115. For example, the computations may instruct the VM 115 to dump any decrypted data stored in the temporary memory space of the VM system 105 upon the generation of result data.

Figure 2B:
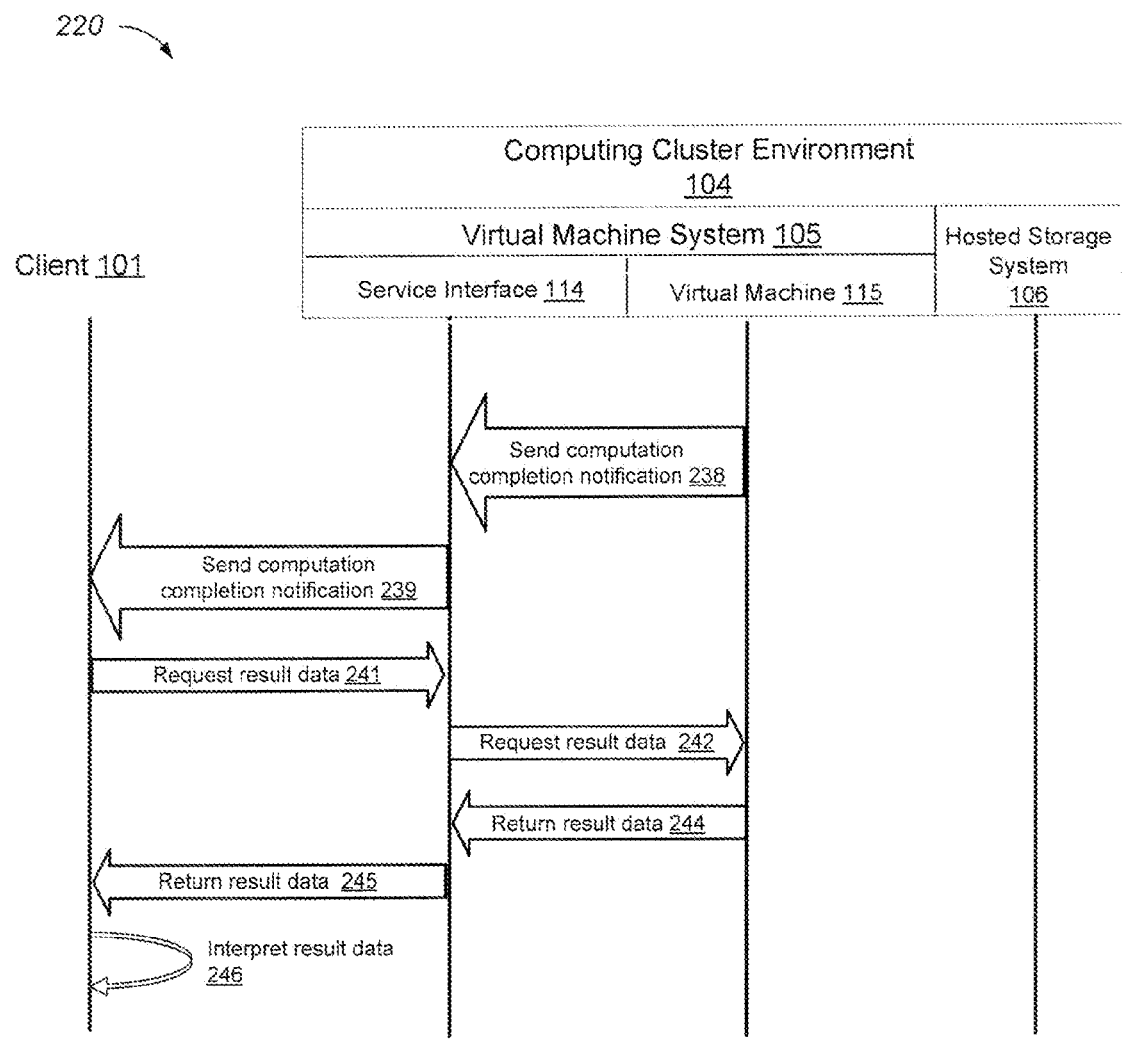
FIG. 2B is a diagram illustrating an example of a process in which the client retrieves the result data from the virtual machine (VM) system after the VM completes the computing job.

FIG. 2B is a diagram illustrating an example of a process 220 in which the client 101 retrieves the result data from the VM system 105 after the VM 115 completes the computing job. In some implementations, once the VM 115 completes the computing job, the VM 115 sends a notification to the service interface 114 on the job completion (238). The service interface 114 then forwards the notification to the client 101 through the secure connection (239).

The client 101 receives the notification that the computing job is complete (239), and the client 101 then sends a request to the service interface 114 for the result data over the secure channel (241). Upon receiving the request for the result data from the client 101, the service interface 114 sends a request to the VM 115 for the result data (242).

In one implementation, the VM 115 encrypts the result data with the DEK after the computing job is complete. In another implementation, the VM 115 leaves the result data unencrypted after the computing job is complete. Upon receiving the request for the result data from the service interface 114, the VM 115 returns the result data to the service interface 114 over the secure connection in the VM system 105 (244). The service interface 114 then sends the result data to the client 101 (245) over the secure channel.

The client 101 then interprets the result data sent by the service interface 114 (246). In one implementation where the result data is encrypted, the client 101 decrypts the encrypted result data with the DEK before interpreting the result data. In another implementation where the result data is unencrypted, the client 101 interprets the result data directly.

Figure 2C:
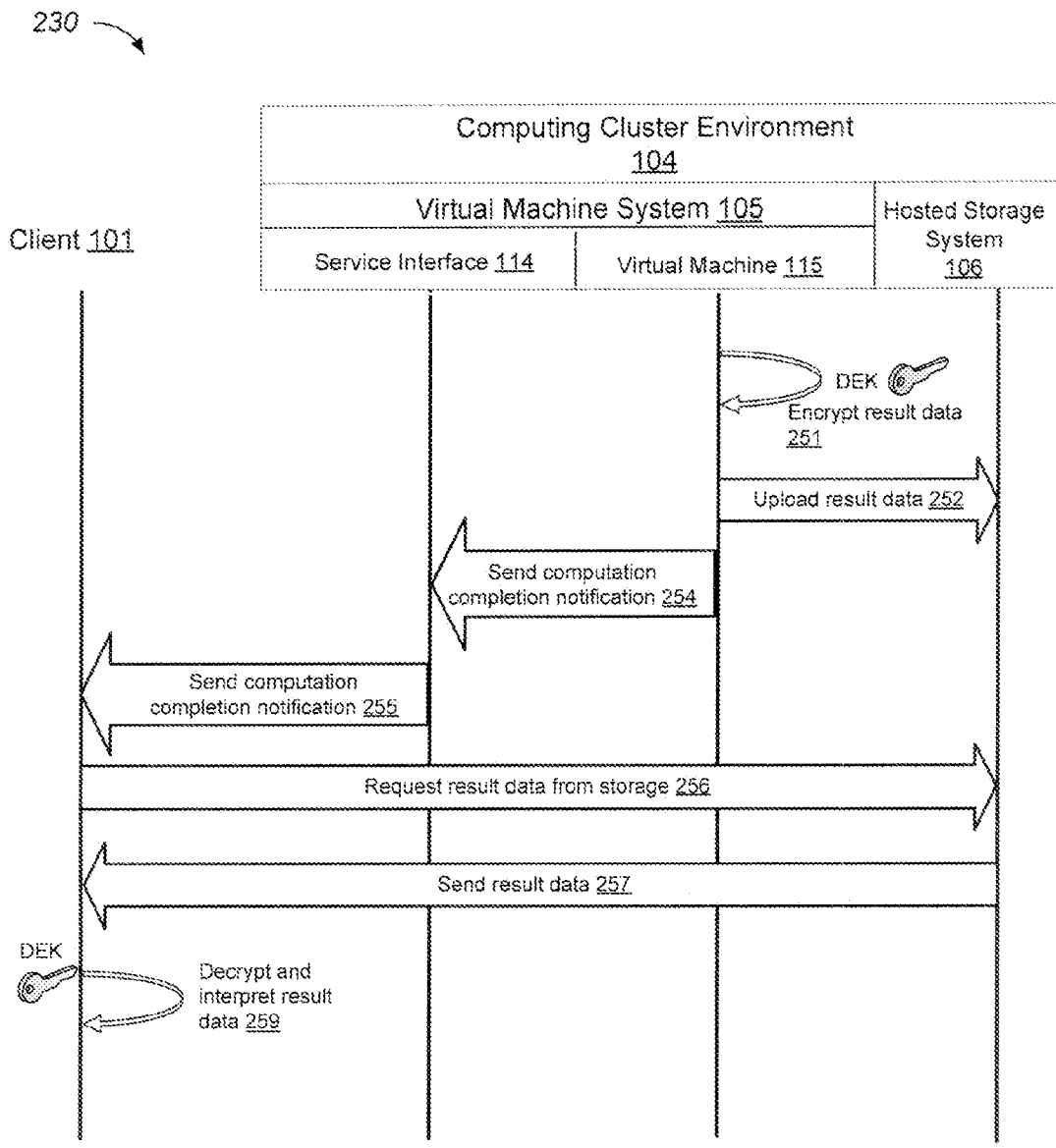
FIG. 2C is a diagram illustrating an example of a process in which the client retrieves the result data from the hosted storage system.

FIG. 2C is a diagram illustrating an example of a process 230 in which the client 101 retrieves the result data from the hosted storage system 106. After the VM 115 completes the computing job (236), the VM 115 encrypts the result data with the DEK to generate encrypted result data (251). Then the VM 115 stores the encrypted result data at the hosted storage system 106 (252). In one implementation, the connection between the VM 115 and the hosted storage system 106 may be secure. In another implementation, the connection between the VM 115 and the hosted storage system 106 may be insecure.

The VM 115 sends a notification to the service interface 114 on the job completion (254). The notification would include where the encrypted result data is stored at the hosted storage system 106. The service interface 114 then sends the notification to the client 101, indicating that the computing job is complete and also indicating where the encrypted result data is stored at the hosted storage system 106 (255).

Upon receiving the notification (255), the client 101 accesses the encrypted result data from the hosted storage system 106 (256). In some implementations, the connection between the client 101 and the hosted storage system 106 is insecure over a public network. The hosted storage system 106 returns the encrypted result data over the insecure connection to the client 101. The client 101 then decrypts the encrypted result and interprets the decrypted result data (259).

Figure 3:
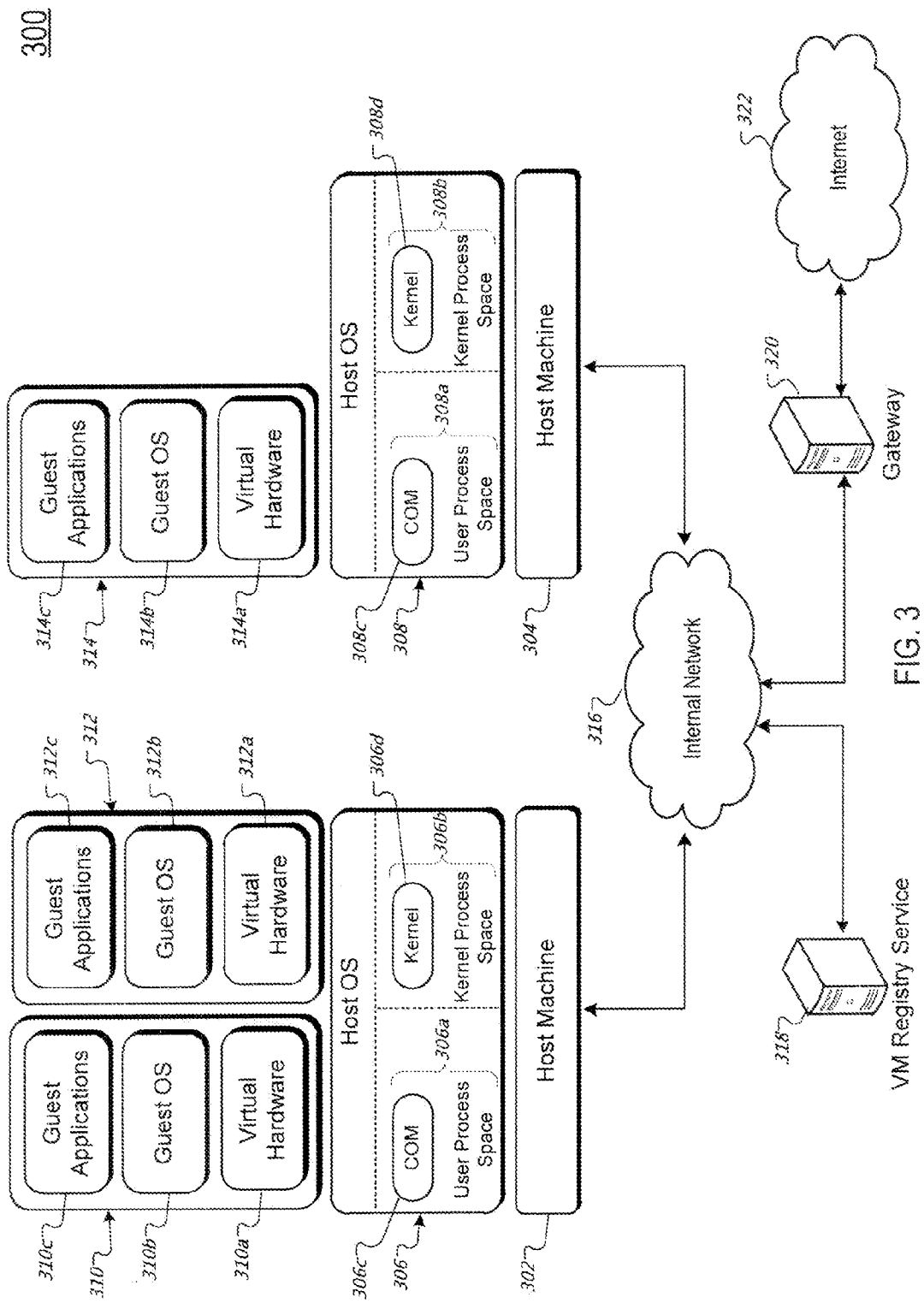
FIG. 3 is a schematic illustration showing an example of a system that provides virtual network connectivity between virtual machines.

FIG. 3 is a schematic illustration of an example virtual machine system 300, which may be used to implement virtual machine system 105. The system 300 includes one or more host machines such as, for example, host machine 302 and host machine 304. Generally speaking, a host machine is one or more data processing apparatus such as a rack mounted servers or other computing devices. The data processing apparatus can be in different physical locations and can have different capabilities and computer architectures. Host machines can communicate with each other through an internal data communications network 316. The internal network can include one or more wired (e.g., Ethernet) or wireless (e.g., WI-FI) networks, for example. In some implementations the internal network 316 is an intranet. Host machines can also communicate with devices on external networks, such as the Internet 322, through one or more gateways 320 which are data processing apparatus responsible for routing data communication traffic between the internal network 316 and the external network 322. Other types of external networks are possible.

Each host machine executes a host operating system or other software that virtualizes the underlying host machine hardware and manages concurrent execution of one or more virtual machines. For example, the host operating system 306 is managing virtual machine (VM) 310 and VM 312, while host OS 308 is managing a single VM 314. Each VM includes a simulated version of the underlying host machine hardware, or a different computer architecture. The simulated version of the hardware is referred to as virtual hardware (e.g., virtual hardware 310a, 312a and 314a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 310, 312 and 314) is allocated a set of virtual memory pages from the virtual memory of the underlying host operating system and is allocated virtual disk blocks from one or more virtual disk drives for use by the guest software executing on the VM. For example, host operating 306 allocates memory pages and disk blocks to VM 310 and VM 312, and host operating system 308 does the same for VM 314. In some implementations, a given VM cannot access the virtual memory pages assigned to other VMs. For example, VM 310 cannot access memory pages that have been assigned to VM 312. A virtual disk drive can be persisted across VM restarts. Virtual disk blocks are allocated on physical disk drives coupled to host machines or available over the internal network 316, for example. In addition to virtual memory and disk resources, VMs can be allocated network addresses through which their respective guest software can communicate with other processes reachable through the internal network 316 or the Internet 322. For example, guest software executing on VM 310 can communicate with guest software executing on VM 312 or VM 314. In some implementations, each VM is allocated one or more unique Internet Protocol (IP) version 4 or version 6 addresses and one or more User Datagram Protocol (UDP) port numbers. Other address schemes are possible.

A VM's guest software can include a guest operating system (e.g., guest operating systems 310b, 312b and 314b) which is software that controls the execution of respective guest software applications (e.g., guest applications 310c, 312c and 314c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 310, when the guest application 310c or guest operating system 310b attempts to perform an input/output operation on a virtual disk, initiate network communication, or perform a privileged operation, for example, the virtual hardware 310a is interrupted so that the host operating system 306 can perform the action on behalf of the virtual machine 310. The host operating system 306 can perform these actions with a process that executes in kernel process space 306b, user process space 306a, or both.

The kernel process space 306b is virtual memory reserved for the host operating system 306's kernel 306d which can include kernel extensions and device drivers, for instance. The kernel process space has elevated privileges (sometimes referred to as "supervisor mode"); that is, the kernel 306d can perform certain privileged operations that are off limits to processes running in the user process space 306a. Examples of privileged operations include access to different address spaces, access to special functional processor units in the host machine such as memory management units, and so on. The user process space 306a is a separate portion of virtual memory reserved for user mode processes. User mode processes cannot perform privileged operations directly.

In various implementations, a portion of VM network communication functionality is implemented in a communication process (e.g., communication process 306c). In some implementations, the communication process executes in the user process space (e.g., user process space 306a) of a host operating system (e.g., host operating system 306). In other implementations, the communication process can execute in the kernel process space (e.g., kernel process space 306d) of the host operating system. There can be a single communication process for all VMs executing on a host machine or multiple communication processes, one for each VM executing on a host machine. In yet further implementations, some portion of the communication process executes in the user process space and another portion executes in the kernel process space. The communication process communicates with a directory service (e.g., VM registry service 318) in order to establish a virtual network pair (VNP) between two VMs. A virtual network pair (VNP) is a logical computer network that is implemented on top of one or more physical (wired or wireless) computer networks. A VNP routes traffic between two endpoints using one or more virtual connections or links. By way of illustration, a VNP between virtual machine 310 and virtual machine 314 would route packets sent between VNP endpoints managed respectively by communication processes 306c and 308c over internal network 316. The VM registry service 318 is one or more data processing apparatus that execute software for keeping track of assignments of network addresses (e.g., IP addresses) to VMs, and for keeping track of network addresses (e.g., IP addresses) of host machines that the VMs are executing on. The data processing apparatus can be in different locations and can have different capabilities and computer architectures.

FIG. 4 is a schematic diagram of an example host machine. The host machine 400 generally consists of a data processing apparatus 402. The data processing apparatus 402 can optionally communicate with one or more other computers 490 through a network 480. While only one data processing apparatus 402 is shown in FIG. 4, multiple data processing apparatus can be used in one or more locations. The data processing apparatus 402 includes various modules, e.g. executable software programs. One of the modules is the kernel 406 of a host operating system (e.g., host operating system 306). A communication process module 404 (e.g., communication process 306c) is configured to establish VNPs, encapsulate packets and to de-encapsulate packets. A virtual machine module 408 (e.g., virtual machine 310) includes virtual hardware (e.g., virtual hardware 310a), a guest operating system (e.g., guest operating system 310b), and guest applications (guest applications 310c). Although several software modules are illustrated, there may be fewer or more software modules. Moreover, the software modules can be distributed on one or more data processing apparatus connected by one or more networks or other suitable communication mediums.

The data processing apparatus 402 also includes hardware or firmware devices including one or more processors 412, one or more additional devices 414, a computer readable medium 416, a communication interface 418, and optionally one or more user interface devices 420. Each processor 412 is capable of processing instructions for execution within the data processing apparatus 402. In some implementations, the processor 412 is a single or multi-threaded processor. Each processor 412 is capable of processing instructions stored on the computer readable medium 416 or on a storage device such as one of the additional devices 414. The data processing apparatus 402 uses its communication interface 418 to communicate with one or more computers 490, for example, over a network 480. Examples of user interface devices 420 include a display, a camera, a speaker, a microphone, a tactile feedback device, a keyboard, and a mouse. The data processing apparatus 402 can store instructions that implement operations associated with the modules described above, for example, on the computer readable medium 416 or one or more additional devices 414, for example, one or more of a floppy disk device, a hard disk device, an optical disk device, or a tape device.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, at a server system and from a client system, a request to instantiate a virtual machine, the request to instantiate the virtual machine including a public key of a public/private key pair associated with the client system;
establishing a secure channel between the client system and the server system using the received public key, the establishing comprising one of:
(i)
encrypting a first plaintext using the received public key to generate a ciphertext;
sending the ciphertext to the client system such that the client system is able to decrypt the ciphertext using a private key of the public/private key pair to generate a second plaintext;
in response to sending the ciphertext to the client system, receiving the second plaintext from the client system;
determining that the second plaintext is the same as the first plaintext; and
in response to determining that the second plaintext is the same as the first plaintext, establishing the secure channel between the client system and the server system; or
(ii)
generating a first plaintext;
sending the first plaintext to the client system such that the client system is able to encrypt the first plaintext using a private key of the public/private key pair to generate a ciphertext;
in response to sending the first plaintext to the client system, receiving the ciphertext from the client system;
decrypting the received ciphertext using the public key to generate a second plaintext;
determining that the second plaintext is the same as the first plaintext; and
in response to determining that the second plaintext is the same as the first plaintext, establishing the secure channel between the client system and the server system;
receiving, at the server system and from the client system, code that when executed, performs computations on data;
receiving, at the server system and from the client system through the secure channel, a request to execute the code to perform the computations on encrypted data stored at the server system;
sending, from the server system and to the client system, a request for a data key configured to decrypt the encrypted data;
receiving, at the server system and from the client system, the data key;
accessing, at the server system, the encrypted data;
decrypting, at the server system, the encrypted data using the data key to generate unencrypted data;
performing, at the server system by executing the code received from the client system, the computations on the unencrypted data in the virtual machine to generate result data; and
providing the result data to the client system.

2. The method of claim 1 wherein:
performing the computations on the unencrypted data in the virtual machine comprises executing the code received from the client system in the virtual machine.

3. The method of claim 1 further comprising:
receiving, at the server system and from the client system, the encrypted data; and
storing, at the server system, the received encrypted data.

4. The method of claim 1 wherein providing the result data to the client system comprises sending the result data to the client system through a secure channel.

5. The method of claim 1 wherein providing the result data to the client system comprises:
encrypting the result data using the data key to generate encrypted result data;
storing the encrypted result data at a hosted storage system; and
providing the client system with an indication of where the encrypted result data is stored such that the client system is able to retrieve the encrypted result data from the hosted storage system.

6. The method of claim 1 wherein:
receiving a request to perform computations on encrypted data comprises receiving, at the server system and from the client system, a one-time job key associated with the computations; and
sending a request for the data key comprises sending the one-time job key from the server system to the client system such that the client system is able to verify that the data key has not previously been sent to the server system for use in performing the computations.

7. A method comprising:
sending, to a server system and from a client system, a request to instantiate a virtual machine, the request to instantiate the virtual machine including a public key of a public/private key pair associated with the client system;

establishing a secure channel between the client system and the server system using the public key, the establishing comprising one of:

(i)
receiving a ciphertext at the client system, wherein the ciphertext was generated at the server system by encrypting a first plaintext using the public key;

decrypting, at the client system, the ciphertext using a private key of the public/private key pair to generate a second plaintext; and sending the second plaintext to the server system such that the server system determines that the second plaintext is the same as the first plaintext, and, in response to determining that the second plaintext is the same as the first plaintext, the server system establishes the secure channel between the client system and the server system; or (ii)
receiving a first plaintext at the client system from the server system;

encrypting the first plaintext using a private key of the public/private key pair to generate a ciphertext; and sending the ciphertext from the client system to the server system such that the server system decrypts the received ciphertext using the public key to generate a second plaintext, determines that the second plaintext is the same as the first plaintext, and, in response to determining that the second plaintext is the same as the first plaintext, establishes the secure channel between the client system and the server system;

sending, to the server system and from the client system, code that when executed, performs computations on data;

sending, to the server system and from the client system through the secure channel, a request to execute the code to perform the computations on encrypted data stored at the server system;

receiving, from the server system and at the client system, a request for a data key configured to decrypt the encrypted data;

in response to receiving the request for the data key, determining, at the client system, that the data key should be sent to the server system;

in response to determining that the determination indicates the data key should be sent to the server system, sending the data key to the server system such that the server system accesses the encrypted data, decrypts the encrypted data using the data key to generate unencrypted data, and performs, by executing the code received from the client system, the computations on the unencrypted data in the virtual machine to generate result data; and accessing, at the client system, the result data.

8. The method of claim 7 comprising:
encrypting, at the client system, data to generate the encrypted data;
storing the encrypted data at a hosted storage system; and
wherein the request to perform computations on the encrypted data includes a location of the encrypted data at the hosted storage system.

9. The method of claim 7 wherein accessing the result data comprises receiving the result data at the client system through a secure channel.

10. The method of claim 7 wherein:
the server system encrypts the result data to generate encrypted result data and stores the encrypted result data at a hosted storage system; and
accessing the result data at the client system comprises retrieving the encrypted result data from the hosted storage system.

11. The method of claim 7 wherein:
sending a request to perform computations on encrypted data comprises sending, to the server system and from the client system, a one-time job key associated with the computations;
receiving a request for the data key comprises receiving the one-time job key from the server system to the client system; and
determining that the data key should be sent to the server system comprises verifying that the data key has not previously been sent to the server system for use in performing the computations.

12. A system comprising:
a server system configured to:
receive, from a client system, a request to instantiate a virtual machine, the request to instantiate the virtual machine including a public key of a public/private key pair associated with the client system;
establish a secure channel between the client system and the server system using the received public key, the establishing comprising one of:

(i)
encrypting a first plaintext using the received public key to generate a ciphertext;
sending the ciphertext to the client system such that the client system is able to decrypt the ciphertext using a private key of the public/private key pair to generate a second plaintext;
in response to sending the ciphertext to the client system, receiving the second plaintext from the client system;
determining that the second plaintext is the same as the first plaintext; and
in response to determining that the second plaintext is the same as the first plaintext, establishing the secure channel between the client system and the server system; or (ii)
generating a first plaintext;
sending the first plaintext to the client system such that the client system is able to encrypt the first plaintext using a private key of the public/private key pair to generate a ciphertext;
in response to sending the first plaintext to the client system, receiving the ciphertext from the client system;
decrypting the received ciphertext using the public key to generate a second plaintext;
determining that the second plaintext is the same as the first plaintext; and
in response to determining that the second plaintext is the same as the first plaintext, establishing the secure channel between the client system and the server system;
receive, from the client system, code that when executed, performs computations on data;
receive, from the client system through the secure channel, a request to execute the code to perform the computations on encrypted data stored at the server system;
send, to the client system, a request for a data key configured to decrypt the encrypted data;
receive, from the client system, the data key;
access the encrypted data;

decrypt the encrypted data using the data key to generate unencrypted data; and perform, by executing the code received from the client system, the computations on the unencrypted data in the virtual machine to generate result data; and the client system configured to:

send, to the server system, the request to perform computations on encrypted data;

receive, from the server system, the request for the data key configured to decrypt the encrypted data;

in response to receiving the request for the data key, determine that the data key should be sent to the server system;

in response to determining that the data key should be sent to the server system, send the data key to the server system; and access the result data generated by the server system.

13. The system of claim 12 wherein:

to perform the computations on the unencrypted data in the virtual machine, the server system is configured to execute the code received from the client system in the virtual machine.

14. The system of claim 12 wherein the server system is configured to:

receive from the client system, the encrypted data; and store the received encrypted data.

15. The system of claim 12 wherein, to provide the result data to the client system, the server system is configured to send the result data to the client system through a secure channel.

16. The system of claim 12 wherein, to provide the result data to the client system, the server system is configured to:

encrypt the result data using the data key to generate encrypted result data;

store the encrypted result data at a hosted storage system; and provide the client system with an indication of where the encrypted result data is stored such that the client system is able to retrieve the encrypted result data from the hosted storage system.

17. The system of claim 12 wherein, to receive a request to perform computations on encrypted data, the server system is configured to receive from the client system, a one-time job key associated with the computations; and to send a request for the data key, the server system is configured to send the one-time job key to the client system such that the client system is able to verify that the data key has not previously been sent to the server system for use in performing the computations.

18. The system of claim 12 wherein the client system is configured to:

encrypt data to generate the encrypted data;

store the encrypted data at a hosted storage system; and wherein the request to perform computations on the encrypted data includes a location of the encrypted data at the hosted storage system.

19. The system of claim 12 wherein, to send a request to perform computations on encrypted data, the client system is configured to send to the server system a one-time job key associated with the computations;

to receive a request for the data key, the client system is configured to receive the one-time job key from the server system; and to determine that the data key should be sent to the server system, the client system is configured to verify that the data key has not previously been sent to the server system for use in performing the computations.

* * * * *